(12) United States Patent
Helmner

(10) Patent No.: US 6,367,615 B1
(45) Date of Patent: Apr. 9, 2002

(54) DEVICE FOR LOADING PACKAGES INTO A CARGO HOLD PARTICULARLY OF AN AIRCRAFT

(75) Inventor: Anders Helmner, Lund (SE)

(73) Assignee: Scandanivian Bellyloading Co., AB, Lund (SE)

( * ) Notice: Subject to any disclaimer, the term of this patent is extended or adjusted under 35 U.S.C. 154(b) by 0 days.

(21) Appl. No.: 09/367,644

(22) PCT Filed: Feb. 25, 1998

(86) PCT No.: PCT/EP98/01069

§ 371 Date: Aug. 19, 1999

§ 102(e) Date: Aug. 19, 1999

(87) PCT Pub. No.: WO98/38087

PCT Pub. Date: Sep. 3, 1998

(30) Foreign Application Priority Data

Feb. 25, 1997 (DE) .......................................... 197 07 519

(51) Int. Cl.[7] .............................................. B65G 25/04
(52) U.S. Cl. ................................. 198/750.1; 244/137.1
(58) Field of Search .......................... 198/750.1, 750.2, 198/468.9; 244/137.1, 118.1; 414/528

(56) References Cited

U.S. PATENT DOCUMENTS

| 5,046,690 A | 9/1991 | Nordstrom | 244/137.1 |
| 5,320,214 A | * 6/1994 | Kordis | 198/750.1 |

FOREIGN PATENT DOCUMENTS

| DE | 4238095 | 5/1994 |
| WO | WO 8706909 | 11/1987 |

OTHER PUBLICATIONS

Van Herpt Eef: "Fokker's moving–belt loading system cuts ground handling costs", Airport Forum No. 4, Sep. 1998, pp. 60–61.
Bigler J.M.: "Flexible Cargo Handling Systems for Standard–Body Airplanes", SAE Technical Paper Series, Proceedings of the Thirteenth International Air Cargo Forum, Jan. 1987, Warrendale, USA, pp. 245–250.

* cited by examiner

Primary Examiner—James R. Bidwell
(74) Attorney, Agent, or Firm—Frishauf, Holtz, Goodman, Langer & Chick, P.C.

(57) ABSTRACT

Device for loading packages into a cargo hold (3) particularly of an aircraft, wherein loading is effected through a conveyor (4) including a plurality of transport paths (41–43). This conveyor is progressively loaded with packages and moved into the rear area of the cargo hold (3). In order to absorb the longitudinal peak forces possibly occurring particularly during loading and unloading, longitudinal beams (7 and 8) are provided which are mounted on the floor side and support the deflection means (6) against the fixedly mounted drive means (5). Hereby the occurring longitudinal forces may effectively be absorbed within the loading system without the aircraft fuselage (1) being weakened through additional holding means in particular in the side wall area, or even damage being caused to the hull of the aircraft.

5 Claims, 4 Drawing Sheets

DEVICE FOR LOADING PACKAGES INTO A CARGO HOLD PARTICULARLY OF AN AIRCRAFT

FIELD OF THE INVENTION

The invention concerns a device for loading packages into a cargo hold, particularly of an aircraft.

BACKGROUND OF THE INVENTION

The cargo holds for luggage, for example of smaller-sized aircraft, are as a general rule positioned in the lower part of the fuselage and extend in the longitudinal direction of the fuselage in a relatively elongate yet small-height structural configuration. In order to fill these cargo holds while making full use of the capacity of the cargo hold, it is necessary to introduce the packages such as, e.g., passengers' luggage into the cargo hold in such a way that the far end area of the cargo hold located opposite a charging opening will also be filled. Such loading of packages has hitherto, however, mostly been performed manually, was cumbersome and very time-consuming.

In order to eliminate this kind of problem, document EP 0 305 391 B1 discloses a loading system comprising a revolving conveyor in the manner of a single carpet extending across the width of the cargo hold. This carpet-type conveyor entirely covers up the cargo hold floor in front of a movable loading bulkhead and has a shape which is adapted to the contour of the aircraft's fuselage. The conveyor enables complete filling of the cargo hold by starting in the area of the charging opening inasmuch as the respective packages can be charged onto the foremost area of the conveyor located in front of the loading bulkhead and will, by and by, be moved in such a way that the charged packages are transported away from the charging opening into the cargo hold. Unloading is performed by reversing this process.

This known loading device performs satisfactorily. As high traction forces may be required at the conveyor particularly during the unloading process, with these forces having to be supported at deflection means arranged in the area of the charging opening and having the form of a guide profile to there deflect the conveyor, mounting the guide profile such as to resist longitudinal forces constitutes a particular problem. If the guide profile transmits such forces to the hull of the aircraft, there is the risk of damage to the hull of the aircraft in the event of peak longitudinal forces (such as, say, due to the suitcases jamming upon unloading).

In order to prevent the forces generated by supporting the frontside deflection of the conveyor from being introduced into the hull of the aircraft, the teaching of EP 0 305 391 B1 relies on a continuous sliding panel between the guide profile in the area of the charging opening and the drive means located at the opposite end of the cargo hold for supporting the guide profile against longitudinal forces. This requires a pressure-resistant conformation of the sliding panel. The assembly according to EP 0 305 391 B1 is suited for this type of support inasmuch as the trough-shaped sliding panel for the single conveyor described there is secured against buckling by its very shape. Mounting of the overall assembly against the acceleration and deceleration forces occurring in flight is achieved by the mounting for the conveyor drive means as well as at the ends of the guide profile. This frame-side fixation of the overall assembly is, however, relieved of the high longitudinal forces which the drive means exert on the conveyor because these forces are intercepted as completely as possible within the overall assembly.

The pressure-resistant conformation of the sliding panel does, however, result in a heavy and/or expensive construction of the sliding panel and in a quite considerable plate thickness.

Document DE 42 38 095 A1 discloses a loading system comprising a conveyor which covers up the cargo hold floor in front of a movable loading bulkhead. Further, the loading system has a shape which is adapted to the contour of the aircraft's fuselage. A deflection means arranged at a charging opening of the cargo hold for deflecting the conveyor is according to this known art supported by a rod which interacts with the area of the drive unit in order to absorb longitudinal forces occurring during the loading process or the unloading process. In one embodiment, the rod is arranged spaced from the floor of the cargo hold and formed so as to be deformable in one lateral direction thereof. Thus, the bar will be elastically deformed into abutment with the floor of the cargo hold as soon as cargo is loaded onto the conveyor. In a second embodiment, the rod is connected with the floor by a brace so that forces immediately can be transmitted to the floor of the cargo hold.

SUMMARY OF THE INVENTION

The invention is therefore based on the object of furnishing a generic loading device which, in comparison, presents a lightweight and slim construction at low production costs, however without forgoing a maximum degree of reliable absorption within the loading device of the peak longitudinal forces occurring during the loading process and in particular during the unloading process.

This object is attained by the characterising features of claim 1.

Subdividing the conveyor into a plurality of transport paths in accordance with the invention allows for a substantially simplified construction of the loading device as, owing to this configuration, supporting members mounted on the floor side may be arranged between transport paths possibly having a planar design. Here it was found that even relatively simple and lightweight supporting members are sufficient for effectively and reliably supporting the deflection means against the opposite end of the loading device.

Due to the fact that the supporting members are mounted on the floor side, buckling of the loading device even in the event of extreme tensile forces can reliably be avoided. The loading device therefore possesses high reliability in operation and a long service life.

Moreover the strains occurring during operation of the loading device are intercepted substantially entirely within the loading device "system" instead of being introduced into the hull of the aircraft. The loading device thus represents a closed system inside the cargo hold and does not create any substantial stresses to its surroundings. Damage to the hull of the aircraft is therefore effectively prevented.

Subdividing the conveyor into a plurality of transport paths creates the additional advantage of reducing the requirements in manufacture and in guiding the transport paths. Furthermore these transport paths may be removed singly, for instance for inspection purposes, in order to grant access to particular areas of the cargo hold floor.

Herein subdivision of the conveyor does not amount to a substantial restriction of convenience of use in comparison with the prior art because the area not covered up by the transport paths and thus not movable is relatively small. Comfortable and complete filling of the cargo hold is thus possible.

It is moreover of advantage that subdividing the conveyor results in a reduction of transverse forces in the conveyor, whereby warping of the transport paths can be reduced essentially and the service life is consequently increased.

It is one more advantage that, without incurring major expenses, the supporting members also allow for increased stability of the overall assembly, whereby even greater loads than in conventional systems can be accommodated through simple means.

Another advantage of the invention resides in the fact that the supporting members mounted on the floor side allow for absorbing dynamic loads resulting, for example, from in-flight turbulences. The reliability and service life of the loading system is thereby further increased.

Inasmuch as the supporting members have the form of longitudinal beams, reliable absorption of the occurring longitudinal forces is possible without necessity for substantive expenses in terms of construction. Manufacture of the loading system according to the invention may therefore be carried out in a simple manner without major expense in terms of costs and time. In addition, the total weight of the assembly may be kept low.

It is moreover advantageous if the support members are held by positive fit on the floor side in the cargo hold so that vertical displacement is substantially precluded whereas longitudinal movement is provided for at the mounting locations. Hereby the introduction of longitudinal forces via the mounting locations at the floor of the cargo space is avoided altogether. In this way, the application of inadmissibly great loads on the cargo hold floor, which might prove detrimental to the fuselage of an aircraft, is prevented from the very beginning. The overall stability of the cargo hold is consequently not degraded.

At the same time, there results the additional advantage that a displacement of the conveyor carrying the packages may be substantially precluded even in a vertical direction in particular during a flight. Such displacement might, for instance, be caused in turbulences owing to the dynamic conditions and would bring about detrimental bending strains. The restricted vertical mobility of the supporting members, on the other hand, advantageously results in a restriction of the vibrations which might occur. The connection at the mounting locations may furthermore be formed to be resilient for additional attenuation of vibrations.

Due to the fact that one sliding panel each is at least partly arranged between the runs of the transport paths and laterally supported in the longitudinal beams and/or lateral supports in the cargo hold, there advantageously results a further effect of stabilisation of the loading system. These sliding panels permit stiffening of the supporting members. As they preferably present a surface having good sliding properties, they moreover enable in a manner known per se to reduce the friction of the transport paths loaded with packages. At the same time they separate the runs of the transport paths moving in countercurrent to reduce the introduction of opposing forces into the paths.

If the transport paths are moreover laterally guided in the longitudinal beams and at the outer edge areas of the conveyor in guide means provided at the side wall of the cargo hold, reliable support of the transport paths is obtained. Lateral shifting of the carpet-type transport paths, together with the warping possibly taking place as a result, may thus be prevented or at least reduced. The reliability and service life of the loading system is hereby further increased.

It is moreover advantageous to form projecting sections which cover the longitudinal beams at least on some of the transport paths. In this way it is possible that immovable sections which might inhibit transport of the packages in the cargo hold are not exposed anywhere in the entire floor area.

BRIEF DESCRIPTION OF THE DRAWINGS

The invention shall herebelow be explained in more detail by the description of embodiments and by reference to the figures of the drawing, wherein.

BRIEF DESCRIPTION OF THE PREFERRED EMBODIMENT

Figure 1:
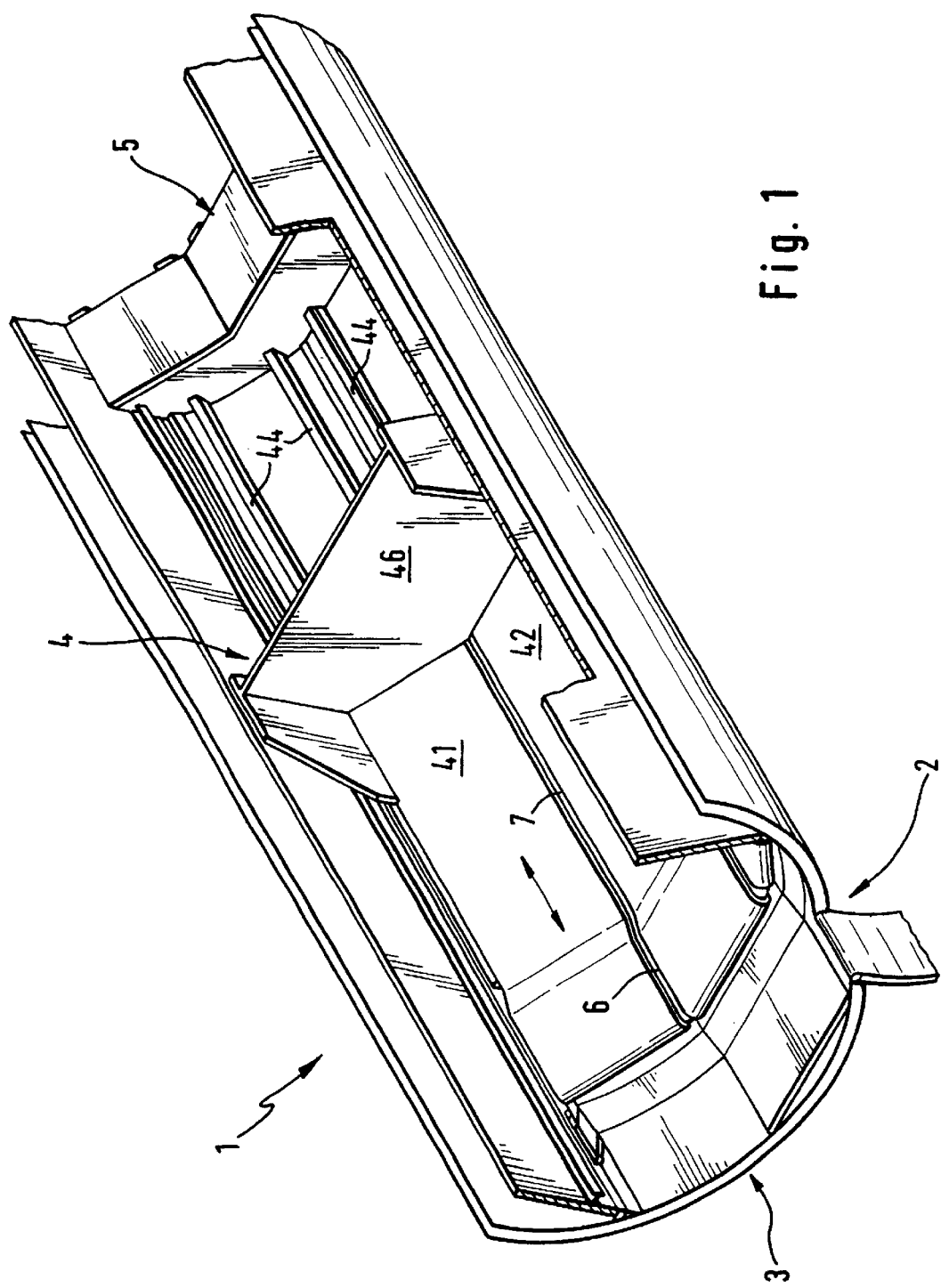
FIG. 1 is a perspective view of a device for loading a cargo hold according to the invention.

Inside an aircraft fuselage 1, of which only the lower part is visible in the figures, a charging opening 2 granting access to a cargo hold 3 is arranged in a lateral position.

In the cargo hold 3 a conveyor 4 substantially covering the floor surface of the cargo hold 3 is arranged. The conveyor 4 is subdivided into three jointly driven transport paths 41, 42 and 43. In accordance with this embodiment these transport paths present belts 44 having tensile strength, on which a carpet-type transport support 45 is applied in the area provided for the loading work. The belts 44 and the transport support 45 comprised, for example, of a flexible textile material consist of materials which are known per se and cooperate in a manner which is described in detail, e.g., in EP 0 305 391 B1. In accordance with the representation of FIG. 2, the belts 44 are reeled up or paid out in accordance with the direction of movement on two drivable rollers 51 and 52 of drive means 5, with the belts 44 and the transport support 45 being deflected around deflection means 6 and returned in the area of the charging opening 2. The deflection means 6 are supported in a known manner in the lateral areas of the cargo hold 3.

Figure 2:
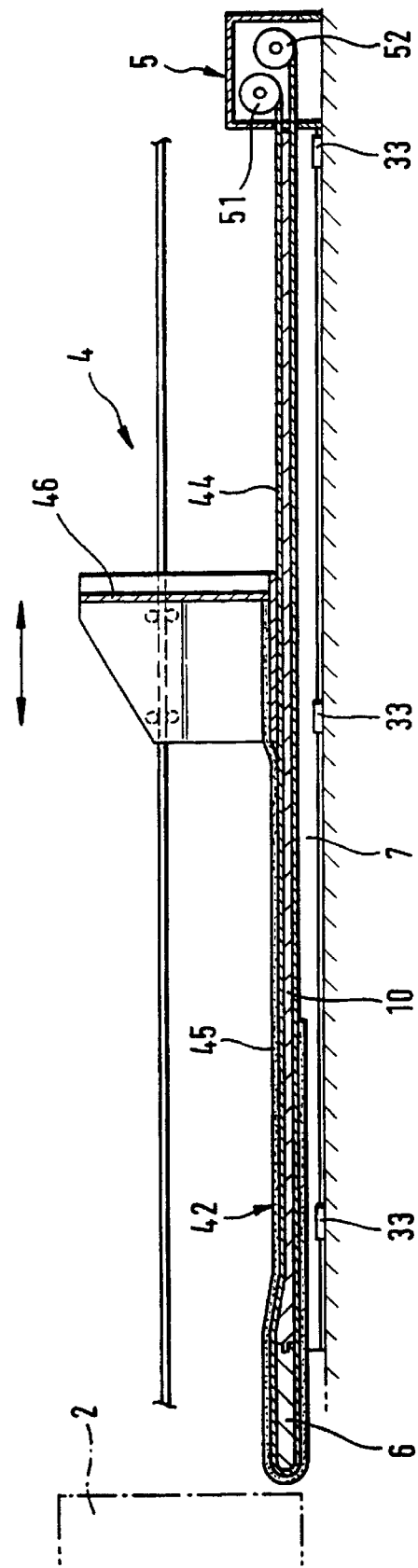
FIG. 2 is a schematic lateral view in accordance with FIG. 1.

As can be seen in particular in FIG. 2, the drive means 5 are located at the end of the cargo hold 3 which is opposite from the charging opening 2.

On the conveyor 4 there is moreover arranged a loading bulkhead 46 which, in this embodiment, is laterally guided at the side walls of the cargo hold 3 in a manner known per se.

Figure 3:
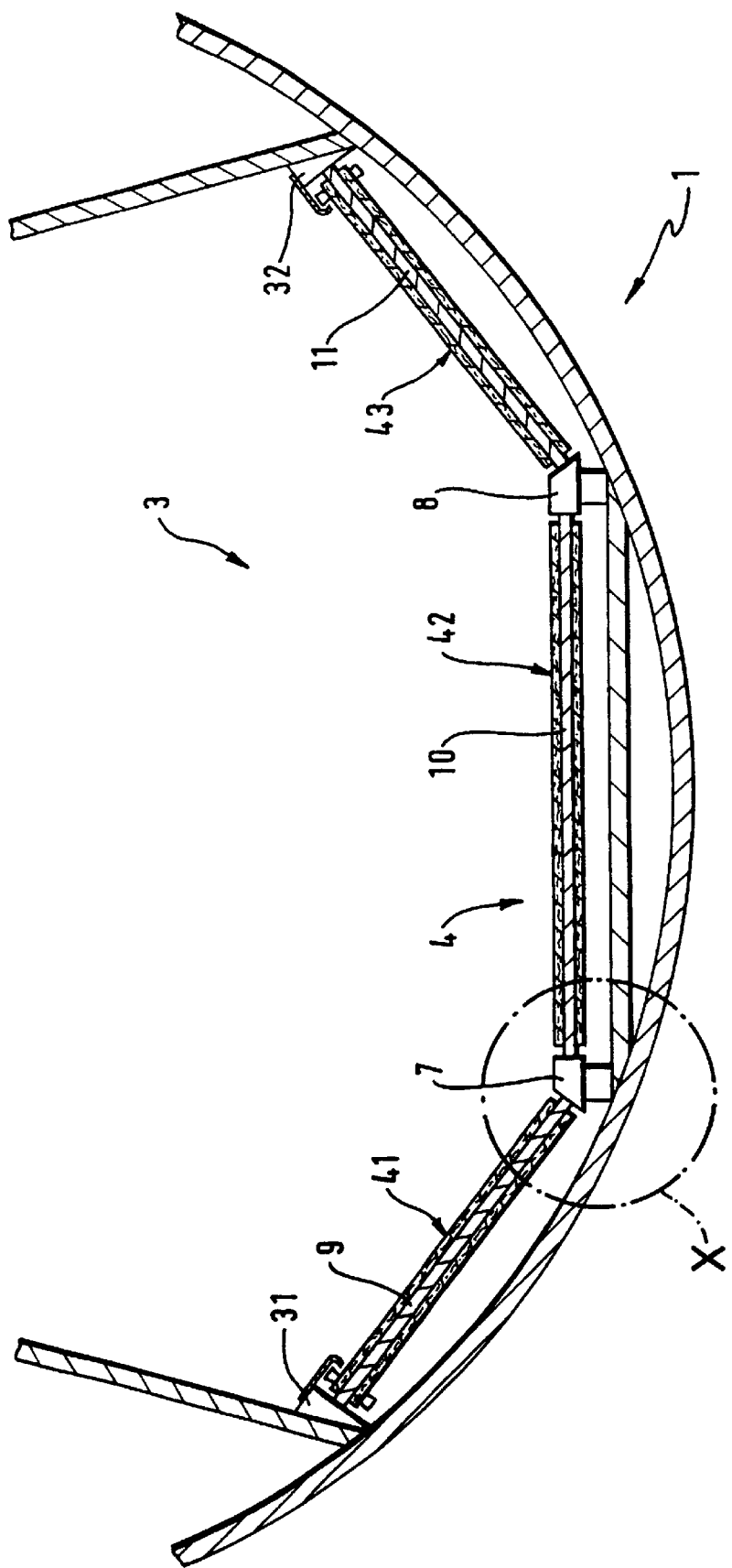
FIG. 3 is a schematic front view in accordance with FIG. 1.
Figure 4:
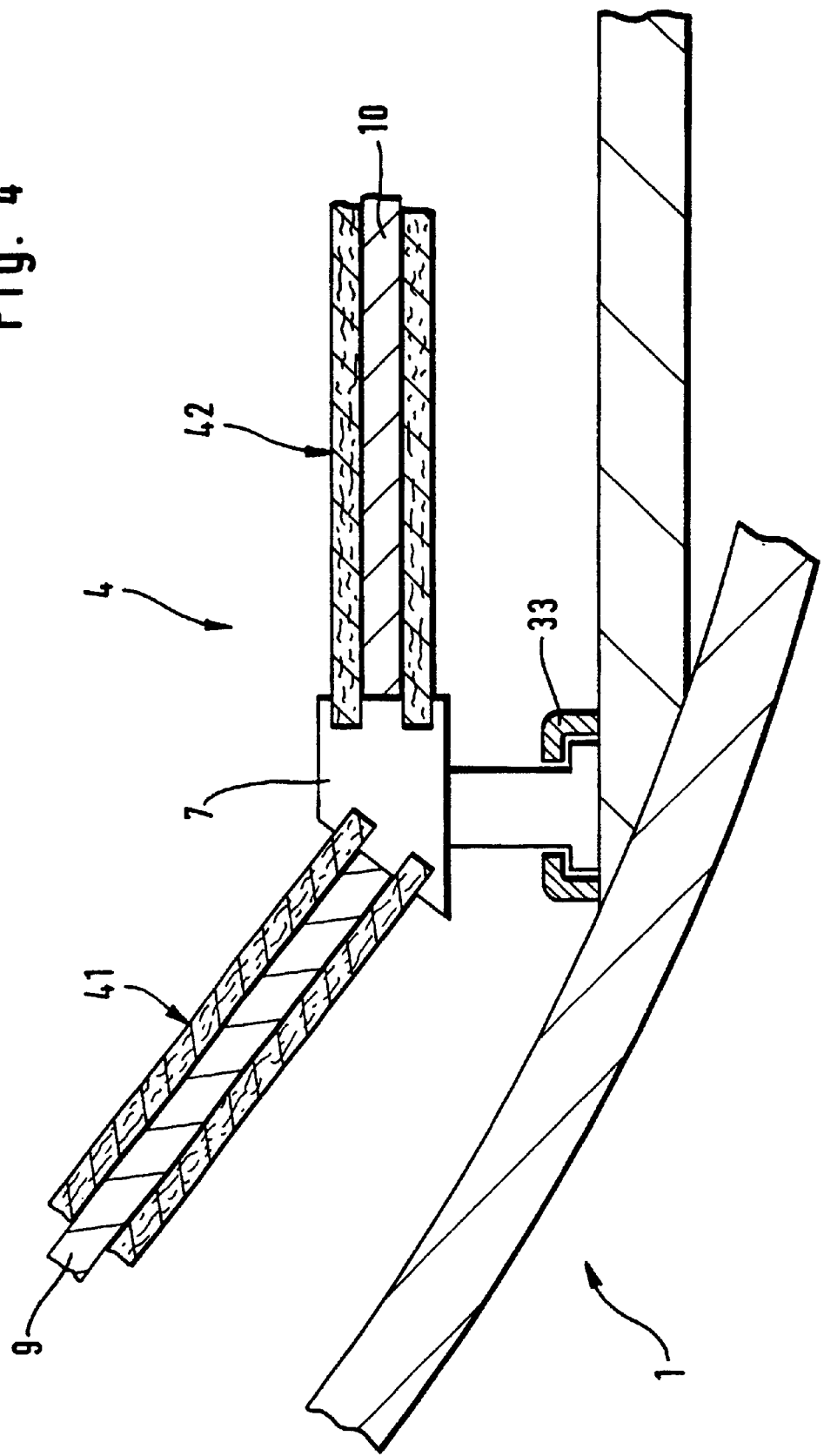
FIG. 4 shows a detail X in accordance with FIG. 3.

As can be seen best in FIGS. 3 and 4, one respective longitudinal beam 7 and 8 having the function of a support member and supporting the deflection means 6 in the longitudinal direction of the cargo hold 3 against the supporting structure of the drive means 5 is arranged between the transport paths 41–43. Moreover respective sliding panels 9, 10 and 11, which are fastened to the longitudinal beam 7 and 8 or the lateral mounts 31 and 32 of the cargo hold 3, are arranged between the runs of the transport paths 41–43. The sliding panels 9 to 11 prevent direct contact between the runs of the transport paths 41–43 moving in countercurrent and moreover comprise a surface having a low coefficient of friction in order to keep the sliding resistance low even during loaded movement.

FIG. 4 shows an embodiment of the assembly by exemplary referring to the longitudinal beam 7. The longitudinal beam 7 presents in its lower section a T-shape which is arranged in positive fit in a correspondingly shaped groove of holding means 33 at the floor of the cargo hold 3. The number of holding means 33 here depends on the length of the cargo hold 3, with e.g. three holding means being provided for each one of longitudinal beams 7 and 8. At the points of contact between the longitudinal beams 7, 8 and the holding means 33 an elastic material is furthermore provided to provide for attenuation of vibrations.

In the upper section the longitudinal beam 7 is fixedly connected to the sliding panels 9 and 10. It additionally includes guide grooves for receiving the transport paths 41–43 through which the lateral sections of these transport paths 41–43 are guided.

The transport paths 41 and 43 having an inclined arrangement in the area of the side walls of the cargo hold 3 are moreover kept in position by holding means which are known per se, such as explained in detail, e.g., in EP 0 305 391 B1.

The structure of the longitudinal beam 8 is analogous to the structure of the longitudinal beam 7 explained by referring to FIG. 4.

In a case where packages are to be loaded, the conveyor 4 is moved by the drive means 5 so that the loading bulkhead 46 is taken into a position in the area of the charging opening 2. The available cargo space is then filled starting out from the loading bulkhead 46. Subsequently the transport paths 41–43 of the conveyor 4 are operated such that the loading bulkhead 46 jointly with the transport support 45 moves a predetermined distance into the rear area of the cargo hold 3. The cargo space now present unoccupied is in turn loaded with packages. This process is repeated until the entire cargo hold 3 is filled with packages, or until the loading bulkhead 46 has assumed its most rearward position. The unloading process takes place in the reverse order.

Particularly during loading and unloading the weight of the packages applies a force onto the transport paths 41–43 which, i.a., manifests in a longitudinal force acting on the deflection means 6. This longitudinal force is counteracted by the longitudinal beams 7 and 8 which support the deflection means 6 against the supporting structure of the drive means 5. Because the longitudinal beams 7 and 8 are not fastened in the longitudinal direction in the holding means 33 at the cargo hold floor but are merely prevented by positive fit from being displaced in a vertical or transversal direction, there is no introduction, or hardly any introduction, of the longitudinal forces into the floor of the cargo hold 3 or into the aircraft fuselage 1. Thus even longitudinal peak forces created, for example, by jamming of the packages during unloading, are effectively neutralised without endangering the functionality of the loading system.

Besides the exemplary embodiments represented here, the invention additionally allows for different design approaches.

Mounting of the longitudinal beams 7 and 8 on the floor of the cargo hold 3 may equally be carried out in a way that is different from the presently described one, wherein care should merely be taken to prevent buckling of the loading device. Conceivable alternative mounts are, for example, connection by chain links or the like.

The transport paths 41–43 do, moreover, not necessarily have to be guided in grooves in the longitudinal beams 7 and 8 because, as is indicated in FIG. 3, these may also slide freely or along resulting steps at the edge area of the longitudinal beams 7 and 8.

Moreover the transport paths 41–43 may comprise projecting sections covering up the longitudinal beams 7 and 8. Exposed immovable surfaces do thus not exist in the area of the loading system, so that reliable transport of the packages may be obtained without disruptions.

The transport paths 41–43 may moreover have the form of true endless paths, in which case merely one driven roller is necessary in the drive means 5.

Furthermore the configuration of the transport paths 41–43 may also be such that for the carpet-type transport support 45 a material is used which has sufficient stability and need not be applied onto the belts 44 but the ends of which can simply be joined to the belts 44. In addition it is also conceivable to design the carpet-type transport support 45 in such a way as to do away with the belts 44. In this case, the transport supports 45 themselves have to be guided around the rollers 51 and 52 or around the single driven roller of the drive means 5 required in the case of the endless belt.

The belts 44 may also be of the positively engaging type such as a tooth belt, in which case the driving roller of the drive means 5 should be suitably selected.

The three transport paths 41–43, starting out from a common drive means, may be driven in synchronicity or singly, with the loading bulkhead 46 then preferably being fastened to the central transport path 42.

The sliding panels 9–11 in the vicinity of the longitudinal beams 7 and 8 are not indispensable for the function of the conveyor 4 and may even be omitted partly or altogether, in particular because they develop their slide effect only in the front area starting out from the charging opening.

In addition an assembly of deflection rollers may be provided at the deflection means 6 in the deflection area of transport paths 41–43 to reduce friction in this area.

The longitudinal beams 7 and 8 may also be fastened rigidly to the holding means 33, which does, however, result in increased introduction of the longitudinal forces into the floor of the cargo hold 3. Moreover the type of connection between the longitudinal beams 7 and 8 and the holding means 33 may differ from the one represented here, wherein, however, vertical mobility of the longitudinal beams 7 and 8 should in any case be avoided.

The number of transport paths 41–43 is in the described example determined to be three by taking into account the particular shape of the aircraft fuselage 1. In another application case, or where the cargo hold has a different cross-sectional shape, it is also possible to provide a different number of transport paths 41–43. In the case of a relatively planar configuration it is for example also possible to only provide one transport path 41–43.

Apart from the application with aircraft as described here, the invention may also be employed for other purposes such as cargo loading in ship or road traffic.

The invention thus furnishes a device for loading packages into a cargo hold 3 particularly of an aircraft, with loading being effected by means of a conveyor 4 including a plurality of transport paths 41–43. This conveyor is progressively charged with packages and moved into the rear area of the cargo hold 3. In order to absorb the peak longitudinal forces possibly occurring particularly during loading or unloading, longitudinal beams 7 and 8 mounted on the floor side are provided which support the deflection means 6 against the fixedly mounted drive means 5. Hereby the occurring longitudinal forces can effectively be absorbed within the loading system without the aircraft fuselage 1 being weakened through additional holding means in particular in the side wall area, or even damage being caused to the hull of the aircraft.

I claim:

1. Device for loading packages into a cargo hold (3) particularly of an aircraft, including a conveyor (4) which is motor-driven such as to be movable starting out from a charging opening (2) of said cargo hold (3) in a direction longitudinal to the direction of the cargo hold (3) towards the opposite end thereof and reverse, wherein a drive unit is located in the area of the end of said device opposite the end nearest to the charging opening, said conveyor (4) being deflected over deflection means (6) arranged in the area of said charging opening (2), wherein said conveyor (4) substantially covers the floor surface of said cargo hold (3) to the charging opening side of a movable loading bulkhead (46) being arranged to move with the conveyor (4), whereby packages charged onto said conveyor (4) in the area of said charging opening (2) may be transported intermittently by proceeding away from said charging opening (2) into said cargo hold (3), wherein said deflection means (6) are supported by support means against the drive unit of said device such that the longitudinal forces applied by said drive unit to the conveyor (4) are at least largely intercepted within said device, wherein said conveyor (4) comprises at least three transport paths (41–43) arranged parallel with each other, wherein said support means comprises at least two longitudinal beams (7, 8) each of which is arranged between two neighbouring ones of said three transport paths (41–43) and held on the floor side in said cargo hold (3), which support said deflection means (6) in the longitudinal direction of said cargo hold (3) against the end of said device opposite from said charging opening (2) and further comprising means for holding said longitudinal beams (7, 8) on the floor side in said cargo hold (3) by positive fit such that a vertical displacement is substantially precluded whereas longitudinal displacement at the fastening locations is made possible.

2. The device in accordance with claim 1, wherein said longitudinal beams (7, 8) are fixed at the end of said device adjacent the drive unit.

3. The device in accordance with claim 1, characterised in that one sliding panel (9, 10 11) each is at least partly arranged between the runs of said transport paths (41–43), wherein said sliding panels are laterally supported in said longitudinal beams (7, 8) on both sides or laterally supported in one longitudinal beam and one of lateral supports (31, 32) in said cargo hold (3).

4. The device in accordance with claim 1, characterised in that said transport paths (41–43) are laterally guided in said longitudinal beams (7, 8) and at the outer edge areas of said conveyor (4) in guide means provided at the side wall of said cargo hold (3).

5. The device in accordance with claim 1, characterised in that projecting sections covering said longitudinal beams (7, 8) are formed at least at several ones of said transport paths (41–43).

\* \* \* \* \*